United States Patent
Sebborn et al.

(12) 
(10) Patent No.: US 6,332,047 B1
(45) Date of Patent: *Dec. 18, 2001

(54) TEST EQUIPMENT FOR COLOR PRINTING

(75) Inventors: Martin Sebborn, Cambridge; Lawrence Mullaney, Royston, both of (GB)

(73) Assignee: Laurie Mullaney Associates Limited (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,730
(22) PCT Filed: Nov. 27, 1996
(86) PCT No.: PCT/GB96/02913
  § 371 Date: Aug. 7, 1998
  § 102(e) Date: Aug. 7, 1998
(87) PCT Pub. No.: WO97/21074
  PCT Pub. Date: Jun. 12, 1997

(30) Foreign Application Priority Data

Dec. 6, 1995 (GB) .................................. 9524932

(51) Int. Cl.$^7$ ........................................ G06K 9/32
(52) U.S. Cl. ............................... 382/298; 430/300
(58) Field of Search ..................... 382/298; 430/18, 430/49, 303, 300; 101/463.1, 465

(56) References Cited

U.S. PATENT DOCUMENTS

| | | | |
|---|---|---|---|
| 3,971,316 | * 7/1976 | Schank et al. | 101/465 |
| 4,357,403 | * 11/1982 | Shimada et al. | 430/18 |
| 4,878,114 | * 10/1989 | Huynh et al. | 358/106 |
| 5,413,672 | * 5/1995 | Hirotsuji et al. | 216/87 |
| 5,659,479 | * 8/1997 | Duley et al. | 364/474.08 |
| 5,966,553 | * 10/1999 | Nishitani et al. | 396/303 |

\* cited by examiner

*Primary Examiner*—Leo Boudreau
*Assistant Examiner*—Kanji Patel
(74) *Attorney, Agent, or Firm*—Galgano & Burke

(57) ABSTRACT

The invention provides a method and apparatus for measuring an imaged printing plate which enables the user to assess the ratio of imaged to non-imaged surface area. According to the method light is projected from a light source (3) over that area of the imaged plate to be measured, the area is enlarged by magnifying means (2), an image of the enlarged area is obtained via a c.c.d. camera (1), electronic signals are captured and red from the camera via an electronic framegrabber (7) to provide an electronic image representing the enlarged area, and the captured image is fed to an electronic circuit for analysis to determine said ratio of surface area.

7 Claims, 2 Drawing Sheets

3 troughs show three dots on image
note: lower = darker

TEST EQUIPMENT FOR COLOR PRINTING

BACKGROUND OF THE INVENTION

Modern colour printing is a high quality business, and more printing companies are introducing testing to ensure that what they print is what the customer requires. This has lead to the increase in the demand for accurate test equipment.

Changes in the types and uses of technology within the printing industry have meant that the available techniques for testing have outstripped existing test equipment. This has lead to the requirement for a new type of test instrument.

Until approximately 5 years ago, and still with some of the smaller printing companies, the following methods were used.

An original artwork is digitised by a device called a scanner to obtain a transparency or picture and, via optical and electronic techniques, an image is produced in a computer readable digital form. The digital image is then manipulated by a computer system and, once completer converted into a form that can be projected onto a piece of film. The film contains the four basic printing colours (Cyan, Magenta, Yellow and Black) and is imaged and developed. The next stage is to make printing plates (one for each colour) from the film which plates are then used to produce the printed picture.

The film is produced by a device called an imagesetter, which uses a laser to mark the film ready for processing; this creates "dots" that make up a printed image. Control of the film production process is achieved by measuring the size and spacing of the dots created on the film and feeding this information back to the imagesetter. Thus, if an area that the imagesetter believes to be 50% is measured at 46%, the measured data is entered into the imagesetter. It will then adjust the exposure level of the laser to compensate. Current test instruments for this technique are called densitometers and they measure one criteria, the density of the printed area, and calculate the percentage dot area. These instruments work by shining a light at the film (or a test proof on paper) and measuring the light transmitted by the film (or reflected by the test proof). The amount of light transmitted/reflected signifies the density of the area being tested.

The goal for some years has been to eliminate the film stage and image directly onto the printing plates, thereby eliminating the associated costs, time and variations introduced through the number of processes involved. Methods to do this have been available in recent years, but the ability to measure accurately the imaged plate has been a problem, with the result that printers are loath to make use of these methods.

The method of correction of errors in dot size/spacing on a printing plate are the same as for the film, with an imagesetter producing the plate in the same way as film. However, as there is no satisfactory method of measuring the dot size/spacing on a printing plate, it is not possible to enter the actual data to allow compensation. Several manufacturers of densitometers have tried to use existing approaches to measure plates. However, with the grained aluminium plates used almost universally today, conventional densitometers are not suitable because of the immense amount of light scatter that causes inaccurate (and inconsistent) readings. This lack of accurate and reliable measuring equipment is the major reason that direct to plate technology has not been taken up widely by the printing industry.

BRIEF SUMMARY OF THE INVENTION

An object of the present invention is to provide an alternative method and apparatus for reliable imaging directly onto the printing plates.

According to this invention, a method of measuring an imaged printing plate comprises providing an even light over the area of the imaged plate to be measured, enlarging said area via magnifying means, obtaining an image of the enlarged area via a c.c.d. camera, capturing electronic signals fed from the camera via an electronic framegrabber to provide an electronic image representing the enlarged area, and feeding the captured image to a microprocessor for analysis to determine the ratio of etched area to surface area.

It will be appreciated that this invention includes apparatus required for effecting the above method, including a source for providing even light, means for magnifying the area of the plate to be measured, a c.c.d. camera for producing an enlarged image of said area, a framegrabber for capturing the enlarged image in electronic form, and a microprocessor for analysing and determining the ratio of etched to surface area.

As mentioned briefly above, a modern printing plate comprises an aluminium alloy base onto which an image (in the form of a pattern of dots) it etched. In order to effect testing, in addition to the actual image, a test strip of target dot areas are added to each plate. These targets are printed at "known" dot percentages and are used to compare actual values against expected. If correct the printer can proceed; if outside of a desired tolerance, the actual values can be entered on the imagesetter to allow a new compensated plate to be produced. As discussed above, the problem with measuring the plate using conventional densitometers is that the surface to be measured does not reflect light in a consistent manner. The effects of grain and surface treatment cause light to stray in an unpredictable manner. In addition, as the chemicals used in the development process age, the colour of the base plate changes, causing errors in the densitometer readings.

In accordance with this invention, this problem is overcome though the use of a c.c.d. camera, operating through a magnifier, linked into a PC and framegrabber to capture images of the plate. These captured images are then analysed to determine how much of the area viewed is etched and how much is surface. Even lighting is important and is preferably provided by a diffused, or infra-red light source.

BRIEF DESCRIPTION OF THE SEVERAL VIEW OF THE DRAWINGS

In order that the invention may be readily understood and further features made apparent, one embodiment will now be described with reference to the accompanying drawings, in which.

DETAILED DESCRIPTION OF THE INVENTION

Figure 1:
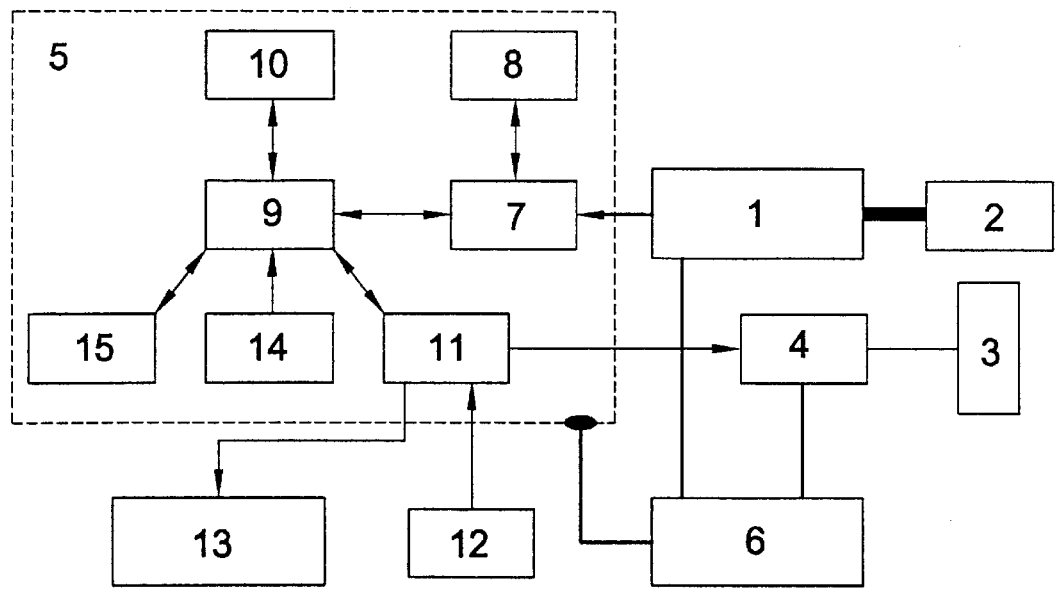
FIG. 1 is a schematic view of the apparatus.

Referring to FIG. 1, the apparatus comprises a c.c.d. camera 1 preferably with a high magnification lens 2 (e.g. of the order of ×100 ), a diffused light source 3 which can be switched on and off and, if desired, set to a desired light value via a light control unit 4 and an electronic circuit 5, which are all connected to a power source 6. The circuit 5 comprises a framegrabber 7, to which the camera is connected, having an associated memory 8 for the capture and temporary storage of images from the camera. The framegrabber is connected to a central processing unit (CPU) 9 having its own associated memory 10 for computation of the images. A switch unit 11, controlled by a push button 12, is connected to the CPU and to an LCD panel 13 for displaying the status of the apparatus, images obtained, and analysis curves. The circuit 5 is completed by an EPROM unit 14 connected to the CPU for holding the software required for the controlled operation of the apparatus, and a serial port 15 for downloading data to an external computer (not shown).

It will be appreciated that the software will undertake the following functions:

Grab an image (via the framegrabber 7),

Initialise the framegrabber, transfer the image to the CPU 9 and load into its memory 10, Analyse the image against assessment criteria, Analyse the image against known criteria and calibration data, Determine a percentage dot area and an average size for the dots, Drive the LCD panel 13, Monitor the push button 12, Output test results via the serial port 15, and Write the results of each reading to the serial port for data to be read into a computer system if required.

Figure 2:
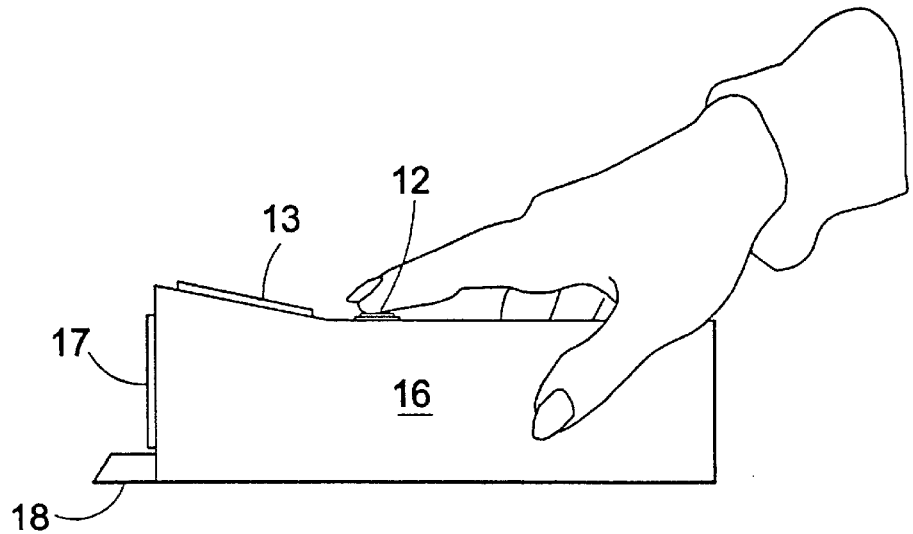
FIG. 2 is a general view of the overall appearance of the apparatus.

Referring to FIG. 2 of the drawings, the apparatus in this embodiment comprises a hand-held unit in which the components described above are within, or on, a casing 16. Furthermore, in this embodiment, the head 17 of the camera, which includes the lens 2, is motorized so that, upon pressing the push buttons 12, it is extended through a port (not shown) in the unit casing to its operating position An aiming sight 18 is provided on the front wall of the casing 16 to facilitate location of the unit at a set distance in front of a printing plate to ensure accurate focusing of the lens 2.

As mentioned above, even lighting is important and is achieved by the use of a diffused "even" annular ring light source 3. Alternatively, an infra-red light source may be used.

In operation, on power up for the first time, the CPU 9 initialises its memory 10 and the framegrabber 7. It then enters a standby mode, monitoring the pushbutton 12.

When the user operates the pushbutton 12 to take a measurement, the CPU turns on the light source 3, activates the LCD panel 13 to display the status of the unit and then instructs the framegrabber 7 to capture a single frame into its memory 8. Once the framegrabber has signalled that it has completed this, the CPU downloads the image into its own local memory 10 and effects an initial analysis in a first pass at the data in its memory as it downloads. The CPU then undertakes a second (and possibly third) pass on the memory data. Prior to downloading to the serial port 15, the light source 3 is turned off.

A dot area value is calculated by the CPU 9 and this is displayed on the panel 13 and a message sent to the serial port 15. It no further activity takes place for 30 seconds, the unit re-enters the standby mode, closing down the framegrabber 7 and LCD panel 13.

Figure 3A:
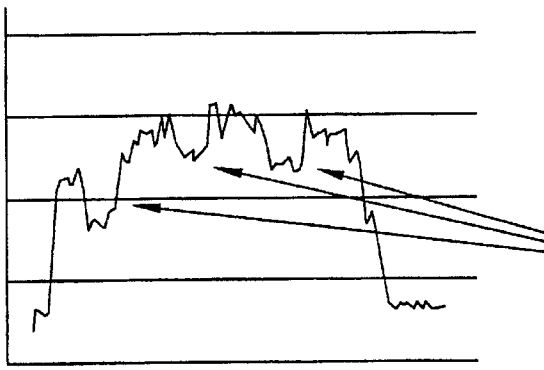
FIGS. 3A and 3B show sample images and corresponding analysis curves that can be achieved using the apparatus.
Figure 3A:
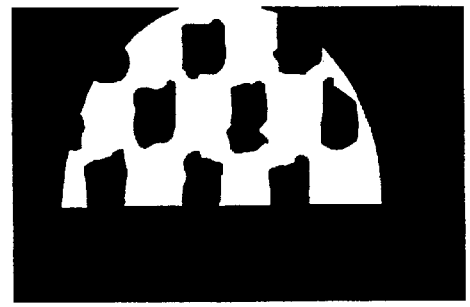
Figure 3B:
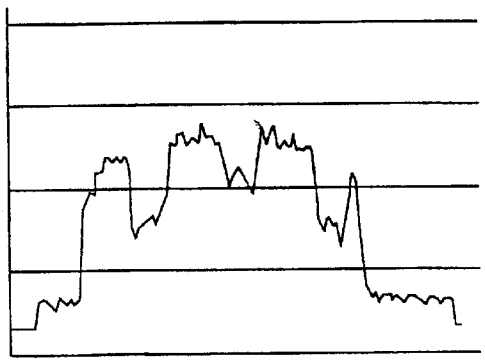
Figure 3B:
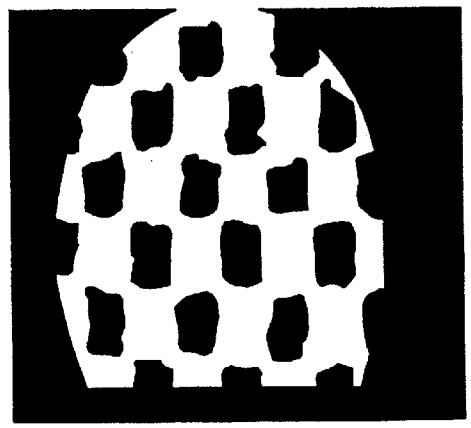

It will be appreciated that the analysis of the grabbed image is the critical part of the system. The image is grabbed as at monochrome image having of the order of 256 greyscales. The spread of light across the image is likely to be such that intelligent software filtering of the image is necessary. This is undertaken based upon an initial analysis of the image during the first pass mentioned above in order to determine the type of plate image. The second pass is then made based upon this known criteria and "expert" assessments of the image are made. From this analysis the number, form a size of dots can be assessed to give a percentage dot area. Sample images and analysis curves are shown in FIGS. 3A and 3B.

In the event that the software does not recognise the particular form of image, a number of plate manufacturers are introducing new methods based upon constant shapes rather than dots—the software does a simple analysis based upon a filtered image. This means that a unit in accordance with this invention is able to operate on virtually any type of printing plate; e.g. in addition to a litho plate, a photopolymer plate which is a relief image plate of plastics material sensitive to UV light.

In addition to analysing the direct image, a calibration factor may be added based upon the effectiveness of the light source 3. Due to the nature of light, it is almost impossible to get truly even light over the full image area. Therefore, on a regular basis, the unit needs to be calibrated by being checked against a known standard to determine the shape, pattern and intensity of the light.

What is claimed is:

1. A method of measuring an imaged printing plate for the ratio of imaged to non-imaged surface area, comprising providing even light over that area of the imaged plate to be measured, enlarging said area via magnifying means, obtaining an image of the enlarged area via a c.c.d. camera, capturing electronic signal fed from the camera via an electronic frame grabber to provide an electronic image representing the enlarged area, feeding the captured image to an electronic circuit, analyzing the captured image by the electronic circuit to determine the ratio of imaged to non-imaged surface area and providing an output of the ratio of imaged to non-imaged surface area.

2. A hand-held apparatus for measuring an imaged printing plate for the ratio of imaged to non-imaged surface area comprising a source for providing even light over the area of the plate to be measured, means for magnifying said area, a c.c.d. camera for producing an enlarged image of said area, a frame grabber for capturing the enlarged image in electronic form, and an electronic circuit for analyzing and determining the ratio of imaged to non-imaged surface area.

3. Apparatus according to claim 2, wherein the c.c.d. camera has magnification means in the form of a high magnification lens.

4. Apparatus according to claim 2, wherein a light source is provided which can be set to a desired light value by a light control unit via an electronic circuit.

5. Apparatus according to claim 4, wherein said electronic circuit includes said framegrabber.

6. Apparatus according to claim 2, wherein the framegrabber has an associated memory for the capture and temporary storage of images from the c.c.d. camera, and wherein the framegrabber is connected to an electronic circuit for the computation of the images.

7. Apparatus according to claim 2, wherein a casing is provided for the c.c.d. camera and associated components, and in which the camera is mounted in such a way that it can be located with the aid of an aiming sight over that area of the imaged plate to be measured.

* * * * *